US010088372B2

(12) United States Patent
Jeong et al.

(10) Patent No.: US 10,088,372 B2
(45) Date of Patent: Oct. 2, 2018

(54) WIRELESS TEMPERATURE MEASUREMENT APPARATUS USING SURFACE ACOUSTIC WAVE DEVICE

(71) Applicant: HANBIT EDS CO., LTD., Daejeon (KR)

(72) Inventors: Jae Kee Jeong, Daejeon (KR); Hong Sung Kim, Daejeon (KR); Pil Seon Eo, Sejong (KR)

(73) Assignee: HANBIT EDS CO., LTD., Daejeon (KR)

( * ) Notice: Subject to any disclaimer, the term of this patent is extended or adjusted under 35 U.S.C. 154(b) by 239 days.

(21) Appl. No.: 15/163,634

(22) Filed: May 24, 2016

(65) Prior Publication Data

US 2017/0336267 A1 Nov. 23, 2017

(30) Foreign Application Priority Data

May 17, 2016 (KR) .......................... 10-2016-0060042

(51) Int. Cl.
*G01K 11/00* (2006.01)
*G01K 11/26* (2006.01)

(52) U.S. Cl.
CPC ................................ *G01K 11/265* (2013.01)

(58) Field of Classification Search
USPC ........................................ 374/141, 100, 117
See application file for complete search history.

(56) References Cited

U.S. PATENT DOCUMENTS

| 7,730,772 | B2* | 6/2010 | Cook | B60C 23/0496 |
| | | | | 73/146.5 |
| 8,240,911 | B1* | 8/2012 | Pfeifer | G01K 17/00 |
| | | | | 374/117 |
| 2007/0139165 | A1* | 6/2007 | Liu | G01F 1/66 |
| | | | | 340/10.4 |
| 2015/0013461 | A1* | 1/2015 | Pollard | H01L 41/1132 |
| | | | | 73/579 |
| 2016/0134255 | A1* | 5/2016 | Min | G01D 11/245 |
| | | | | 310/313 R |
| 2016/0328637 | A1* | 11/2016 | Viikari | G06K 19/0717 |

FOREIGN PATENT DOCUMENTS

KR 10-1999-0067447 A 8/1999

* cited by examiner

*Primary Examiner* — Mirellys Jagan
(74) *Attorney, Agent, or Firm* — Paratus Law Group, PLLC

(57) ABSTRACT

Disclosed is a wireless temperature measurement apparatus using a SAW device which calculates a temperature by detecting a change in resonance frequency, the resonance frequency being physically changed by a temperature. The apparatus includes: a surface acoustic wave (SAW) device including an inter-digital transducer (IDT) generating a surface acoustic wave and a reflector reflecting the surface acoustic wave and outputting the wave to an antenna, wherein the surface acoustic wave is physically deformed by a temperature change, and a reader generating a transmitting signal within a set frequency band and transmitting the signal to the SAW device, detecting an amplified resonance frequency signal which matches a deformed surface acoustic wave, the deformed surface acoustic wave being one of the reflected waves and being physically deformed by the temperature change, and detecting a temperature of the SAW device by comparing the amplified resonance frequency with a preset frequency.

6 Claims, 6 Drawing Sheets

WIRELESS TEMPERATURE MEASUREMENT APPARATUS USING SURFACE ACOUSTIC WAVE DEVICE

CROSS REFERENCE TO RELATED APPLICATION

The present application claims priority to Korean Patent Application No. 10-2016-0060042, filed May 17, 2016, the entire contents of which is incorporated herein for all purposes by this reference.

BACKGROUND OF THE INVENTION

Field of the Invention

The present invention relates generally to a wireless temperature measurement apparatus using a surface acoustic wave (SAW) device, the apparatus calculating a temperature by detecting a change in resonance frequency that is changed by a physical characteristic according to a temperature change in a substrate constituting the SAW device.

Description of the Related Art

Typically, a mechanical apparatus or an electric/electronic apparatus generates much heat during operation. This heat may have a significant impact on the apparatus during operation, and may even cause failure of the apparatus.

In an effort to solve the problem in the related art, the mechanical or electric/electronic apparatus is provided with a temperature detecting means capable of allowing the apparatus to be operated in an optimum temperature condition by detecting the temperature of the apparatus during operation.

There are various kinds of temperature detecting means according to a feature of the apparatus to be detected. In recent years, electronic thermometers have been widely used as the temperature detecting means since the thermometers are highly precise, and have simple configurations making them easy to mount.

The temperature detecting means may be mounted in a furnace or in place difficult for persons to access. A temperature detecting device is used as the temperature detecting means that is mounted in such places. The temperature detecting device checks the temperature by wireless detection as persons cannot directly check the temperature sensed the temperature sensing means.

Patent document 1 is an example of various techniques of remotely checking temperature.

For example, a conventional remote temperature detecting device disclosed in patent document 1 can wirelessly transmit detected temperatures. Therefore, such a device is advantageous in that users can check temperatures without directly accessing the places in which temperature detection is needed.

However, such conventional techniques that wirelessly detect temperatures are problematic in that there is a limit in the distance that information indicative of the detected temperature can be transmitted and received.

Meanwhile, various sensors that use a surface acoustic wave (SAW) device have been developed. However, at present there are no techniques using the SAW device for temperature detection.

DOCUMENTS OF RELATED ART (Patent Document 1) Korean Patent Application Publication No. 10-1999-0067447.

SUMMARY OF THE INVENTION

Accordingly, the present invention has been made keeping in mind the above problems, and the present invention is intended to propose a wireless temperature measurement apparatus using a surface acoustic wave (SAW) device which calculates a temperature by detecting a change in resonance frequency, the resonance frequency being changed by a physical characteristic according to a temperature change in a substrate constituting the SAW device.

In order to achieve the above object, according to one aspect of the present invention, there is provided a wireless temperature measurement apparatus using a SAW device, the apparatus may include: a SAW device including an inter-digital transducer (IDT) that generates a surface acoustic wave by an applied alternating current (AC) signal and a reflector which reflects the surface acoustic wave generated by the IDT and outputs the wave to an antenna, wherein a vibration characteristic of the surface acoustic wave of the SAW device is defamed by a physical characteristic deformation caused by a temperature change; and a reader generating a transmitting signal within a set frequency band and transmitting the transmitting signal to the SAW device, detecting an amplified resonance frequency signal which matches a deformed surface acoustic wave, the deformed surface acoustic wave being one of the reflected waves output from the SAW device and being physically deformed according to the vibration characteristic of the SAW device which is deformed by the temperature change, and detecting a temperature of a place in which the SAW device is mounted by comparing the amplified resonance frequency with a preset frequency.

The reader may include: a receiving part receiving the reflected wave through the antenna, the reflected wave being output from the SAW device; a transmitting part generating a transmitting signal within the set frequency band to be transmitted to the SAW device, and transmitting the transmitting signal to the antenna; and an arithmetic processing part calculating the temperature with respect to a frequency by comparing the resonance frequency of the received signal, which is received by the receiving part, with the preset frequency.

The reader may further include a switching part provided between the receiving part and the transmitting part and switching from a transmitting mode to a receiving mode, or vice-versa, such that signals that are transmitted from and received by the antenna are transmitted to the arithmetic processing part without interfering with each other.

The receiving part may include at least one amplifier amplifying the reflected wave received from the antenna, at least one filter passing only an amplified resonance frequency signal that matches the defamed surface acoustic wave, the deformed surface acoustic wave being physically deformed according to the vibration characteristic of the SAW device which is deformed by the temperature change, and a voltage conversion circuit outputting a DC voltage to the arithmetic processing part, wherein the DC voltage is proportional to an amplitude of the reflected wave corresponding to the resonance frequency which has been amplified and filtered.

The transmitting part may include: a transmitter-phase locked loop (Tx-PLL) generating the transmitting signal within the set frequency band; at least one filter outputting only a signal having a defamed frequency among signals generated by the Tx-PLL to the antenna, wherein the deformed frequency is the frequency of the deformed surface acoustic wave changed by the physical characteristic of the SAW devices according to the temperature change; and an amplifier amplifying the signals generated by Tx-PLL and transmitting the amplified signals to the antenna.

The arithmetic processing may simultaneously shut down power supplied to the Tx-PLL when the transmitting signal is output from the Tx-PLL, such that the transmitting signal output from the Tx-PLL is free from affecting the receiving part.

As described above, a wireless temperature measurement apparatus using a SAW device according to an embodiment of the present invention is capable of wirelessly detecting the temperature of a place a person cannot access.

Also, the present invention realizes a temperature measurement system with high accuracy from a distance by adjusting output power and reception sensitivity of the measurement apparatus. In particular, due to the temperature measurement system, temperatures of places difficult for persons to access, such as an electric power facility, can be easily and accurately measured from a distance.

DETAILED DESCRIPTION OF THE INVENTION

Figure 1:
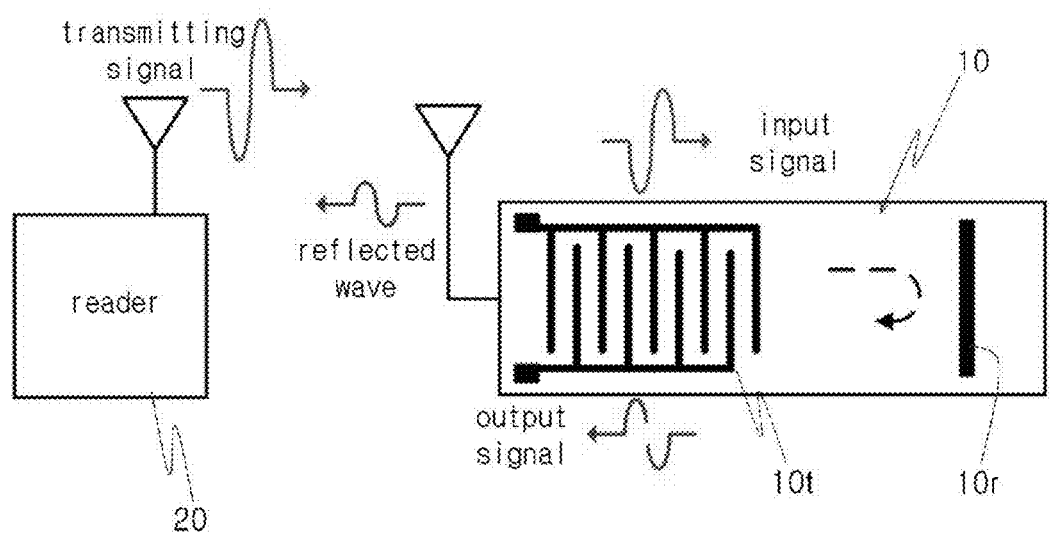
FIG. 1 is a block diagram of a wireless temperature measurement apparatus using a SAW device according to the present invention.

The present invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

In the drawings, like reference numerals indicate like or functionally similar elements. If the specific description of the related prior art in the following description of the present invention is determined to obscure the gist of the present invention, a detailed description thereof will be omitted.

The invention is herein described, by way of example only, with reference to the accompanying drawings.

A wireless temperature measurement apparatus using a SAW device according to the present invention, as shown in FIG. 1, includes a surface acoustic wave (SAW) device 10, a reader 20 which calculates a temperature from a frequency change in the surface acoustic wave, the frequency of the surface acoustic wave is changed according to a characteristic deformation of the SAW device 10 caused by heat.

In the below description, "deformed frequency" refers to a frequency of the SAW device 10 that is physically deformed according to a temperature change, and "resonance frequency" refers to a frequency signal that matches the deformed frequency among signals which are transmitted from the reader 20 to the SAW device 10.

Figure 2:
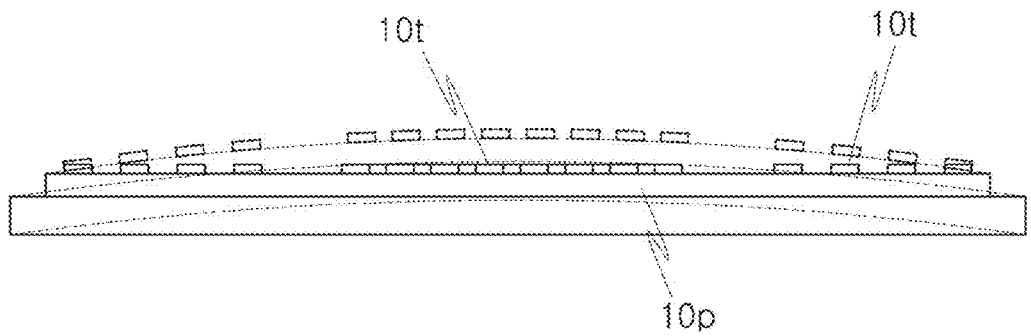
FIG. 2 is a side view of the SAW device included in the wireless temperature measurement apparatus using the SAW device according to the present invention.

The SAW device 10, as shown in FIGS. 1 and 2, includes an inter-digital transducer (IDT) 10$t$ that generates a surface acoustic wave by an applied alternating current (AC) signal, and a reflector 10$r$ which reflects the surface acoustic wave generated by the IDT 10$t$ and outputs the reflected wave to an antenna.

The SAW device 10 has the same configuration and effect as conventional SAW devices which are used in various fields, wherein the IDT 10$t$ is deposited on a piezoelectric substrate 10$p$, and a surface acoustic wave is generated by the IDT 10$t$ by inputting signal on an electrode of the IDT 10$t$.

The reflector 10$r$ is disposed on one end of the IDT 10$t$ and reflects the surface acoustic wave output from the IDT 10$t$.

Figure 3:
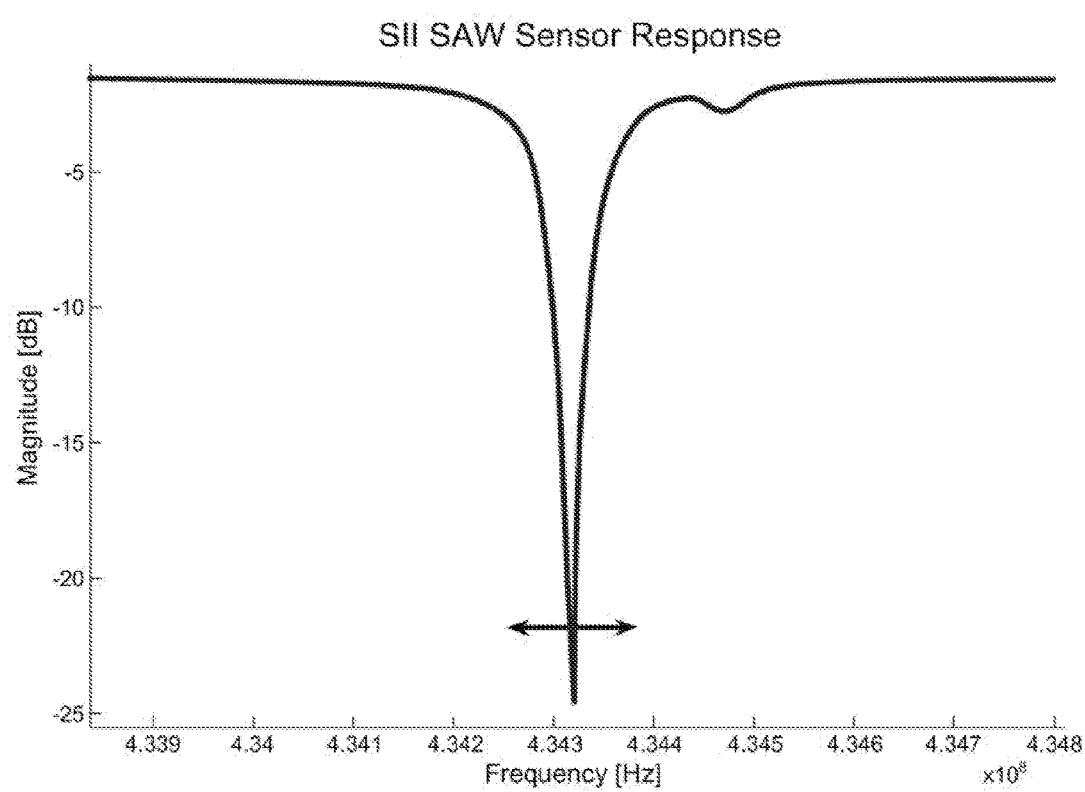
FIG. 3 is a graph illustrating a frequency change according to a temperature change in the SAW device.

As shown in FIG. 2, a physical characteristic of the SAW device 10 is deformed as an ambient temperature changes, and as shown in FIG. 3, a frequency characteristic is also changed.

Thus, the temperature of a place in which the SAW 10 is mounted may be known by finding the deformed frequency of the SAW device 10, which has been changed by the temperature change.

The reader 20 is a means for detecting a vibration frequency change, which occurs due to the temperature change.

The reader 20 generates a transmitting signal within a set frequency band and transmits the transmitting signal to the SAW device 10, detects the resonance frequency among signals received from the SAW device 10 that matches the deformed frequency which is output from the SAW device 10, finds a temperature which corresponds to the detected resonance frequency by comparing the detected resonance frequency with a preset frequency, and determines the temperature in which the SAW device 10 is mounted.

In other words, among the transmitting signals which are transmitted from the reader 20 to the SAW device 10, there is a resonance frequency that matches the deformed frequency of the SAW device 10. When this resonance frequency is combined with the deformed frequency, the frequency of the reflected wave that matches the resonance frequency becomes larger than other reflected waves, and the temperature in which the SAW device 10 is mounted can be detected by detecting the enlarged frequency.

Figure 4:
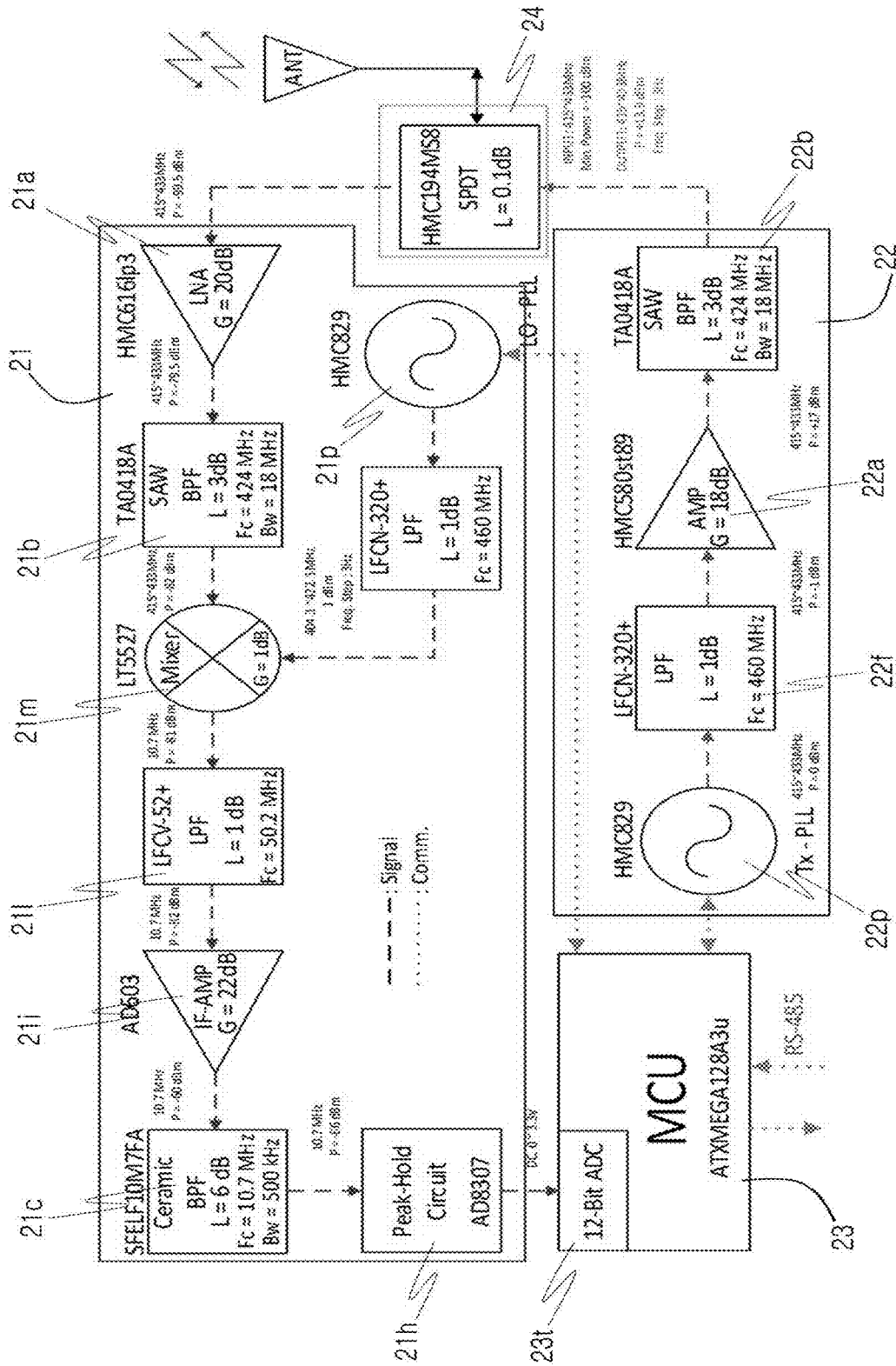
FIG. 4 is a block diagram of a reader included in the wireless temperature measurement apparatus using the SAW device according to the present invention.
Figure 5:
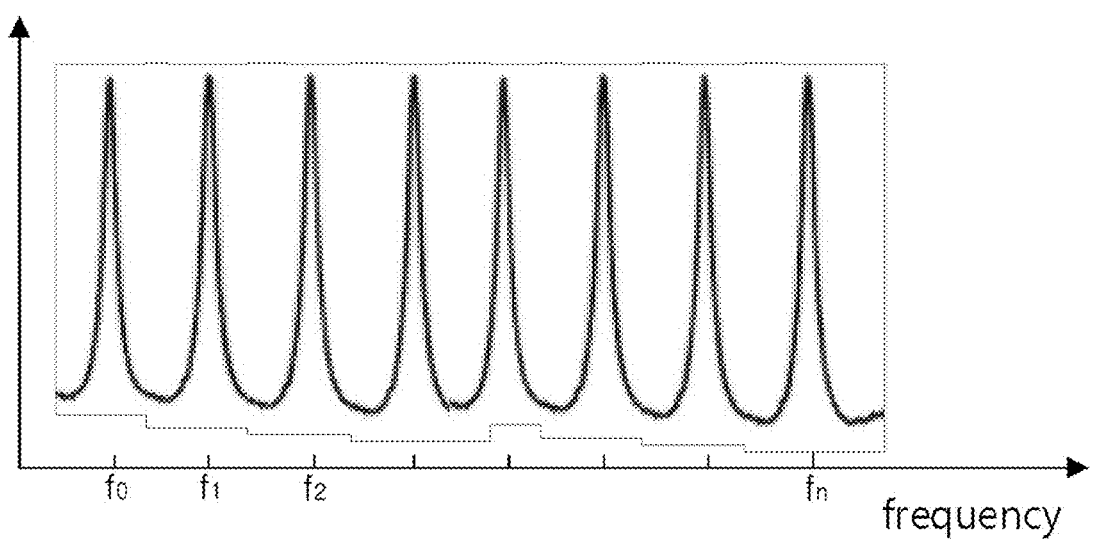
FIG. 5 is a graph illustrating a transmitting signal of the reader.

The reader 20 may be implemented in various modifications; however, a preferred configuration example is shown in FIG. 4.

Referring to FIG. 4, an example of the reader 20 will be described in detail.

The reader 20 includes a receiving part 21 which receives the reflected wave output from the SAW device 10, a transmitting part 22 which generates a transmitting signal within the set frequency band to be transmitted to the SAW device 10 and transmits the transmitting signal to the antenna, and an arithmetic processing part 23 which calculates the temperature with respect to a frequency by comparing the resonance frequency of the received signal, which is received by the receiving part 21, with the preset frequency.

The receiving part 21 receives the reflected wave deformed according to a vibration characteristic of the SAW device 10 which is physically deformed by the temperature change, and includes one or more amplifiers 21a and 21i.

One of the amplifiers 21a and 21i is a low-noise amplifier 21a which amplifies the reflected wave output from the antenna of the SAW device 10 and received by the antenna of the reader 20. The low-noise amplifier 21a is used to remove noises of the reflected wave, which is wirelessly received.

The other amplifier 21i is an intermediate frequency amplifier and amplifies an intermediate frequency since the frequency of the received reflected wave is lowered to the intermediate frequency. And the amplified intermediate frequency is transmitted to the subsequent circuit.

Also, the receiving part 21 includes a voltage conversion circuit 21h which outputs a DC voltage to the arithmetic processing part 23, and the voltage is proportional to the amplitude of the reflected wave which corresponds to the resonance frequency which has been amplified and filtered.

A peak-hold circuit may be used as the voltage conversion circuit 21h and converts the largest signal, among the received reflected waves which corresponds to the resonance frequency, to the DC voltage.

Also, the receiving part 21 further includes a ceramic filter 21c which is provided before the voltage conversion circuit 21h to increase the selectivity of resonance frequency among the signals received by the receiving part 21.

Also, the receiving part 21 may further include a local oscillator phase locked loop (LO-PLL) 21p.

The LO-PLL 21p is used such that the resonance frequency is not interfered with other reflected waves. A signal generated by the LO-PLL 21p is combined with the resonance frequency through a frequency down mixer 21m, and therefore, the frequency of the resonance frequency is lowered.

The output of the frequency down mixer 21m is as follows.

$$F_{out} = F_{in} - F_{Local}$$

Herein, $F_{in}$ is the resonance frequency which is received by the receiving part 21, $F_{local}$ is a calibration frequency generated by the LO-PLL 21p.

The transmitting part 22 is a means for transmitting signal to measure the temperature of the SAW device 10, and includes: a transmitter-phase locked loop (Tx-PLL) 22p which generates the transmitting signal within the set frequency band; one or more filters 22f and 22b which output only signals having the deformed frequency among signals generated by the Tx-PLL 22p to the antenna, the deformed frequency being a frequency of the SAW device 10 that is physically is deformed by temperature change; and an amplifier 22a which amplifies the signal generated by Tx-PLL 22p and transmits the amplified signals to the antenna.

The Tx-PLL 22p generates various frequency signals, and frequency band of the signal generated by the Tx-PLL 22p is the same as the deformed frequency band when the SAW device 10 is deformed by heat.

The filters 22f and 22b are a low-pass filter 22f and a band-pass filter 22b, respectively. The low-pass filter 22f is used to remove harmonic components of the Tx-PLL 22p and the band-pass filter 22b is used to remove frequency signals except for the deformed frequency band among the signals generated by the Tx-PLL 22p, the deformed frequency band is the band of the SAW device 10 that is physically deformed by temperature change.

Also, the reader 20 further includes a switching part 24.

The switching part 24, as shown in FIG. 4, is provided between the receiving part 21 and the transmitting part 22, and switches from a transmitting mode and a receiving mode, or vice-versa, such that signals that are transmitted from and received by the antenna are transmitted to the arithmetic processing part 23 without interfering with each other.

The transmitting signal which is output from the Tx-PLL 22p may affect the receiving part 21 since the output power of the Tx-PLL 22p is high.

Thus, it is preferable to shut-down the power supplied to the Tx-PLL 22p as soon as the transmitting signal is output from the Tx-PLL 22p such that the transmitting signal output from the Tx-PLL 22p is free from affecting the receiving part 21. The arithmetic processing part 23 may control the shut-down of the power supplied to the Tx-PLL 22p.

The arithmetic processing part 23 controls the receiving part 21 and the transmitting part 22, and includes a microcomputer. As described above, the arithmetic processing part 23 calculates the temperature by converting the resonance frequency received from the SAW device 10 to the temperature corresponding to the preset frequency.

The arithmetic processing part 23 stores frequency values which are changed according to the physical characteristic of the SAW device 10 caused by heat and temperature values corresponding to the frequency values.

Hereinafter, a method of measuring temperature by using the wireless temperature measurement device using the SAW device 10 configured as describe above is described.

As it is already described on the description of the wireless temperature measurement device using the SAW device 10, the transmitting signal generated by the Tx-PLL 22p of the reader 20 is amplified and filtered, and transmitted to the SAW device 10 through the antenna. Then the IDT 10t of the SAW device 10 generates the surface acoustic wave by using the transmitting signal, and the surface acoustic wave is reflected by the reflector 10r.

Since the physical characteristic of the SAW device 10 is changed according to temperature change, the changed physical characteristic also changes the frequency of the surface acoustic wave. Therefore, a deformed frequency signal is generated from the SAW device 10.

Figure 6A:
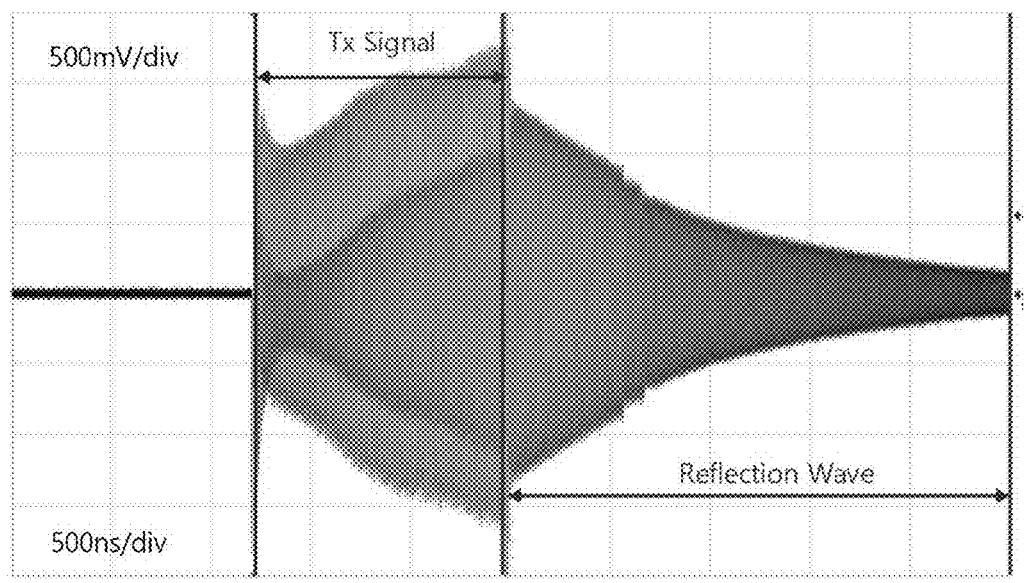
FIGS. 6A and 6B are views illustrating reflected waves received by the reader.
Figure 6B:
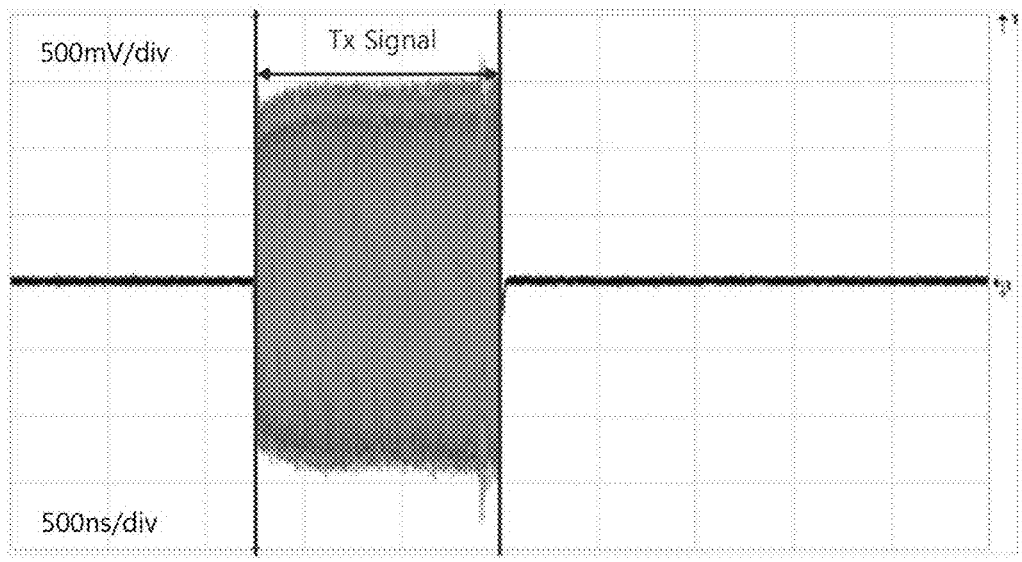

As shown in FIG. 6A, although the defamed frequency signal of the SAW device 10, which is deformed in response to the temperature change, is the same as the frequency of the transmitting signal transmitted from the reader 20, the reflected wave also becomes large. However, as shown in FIG. 6B, when the deformed frequency differs from the frequency of the transmitting signal transmitted from the reader 20, the reflected wave becomes small or does not appear at all.

Thus, the temperature of the place in which the SAW device 10 is mounted may be measured by finding the resonance frequency that matches the deformed frequency of the SAW device 10, and finding the temperature value corresponding to the resonant frequency.

Figure 7:
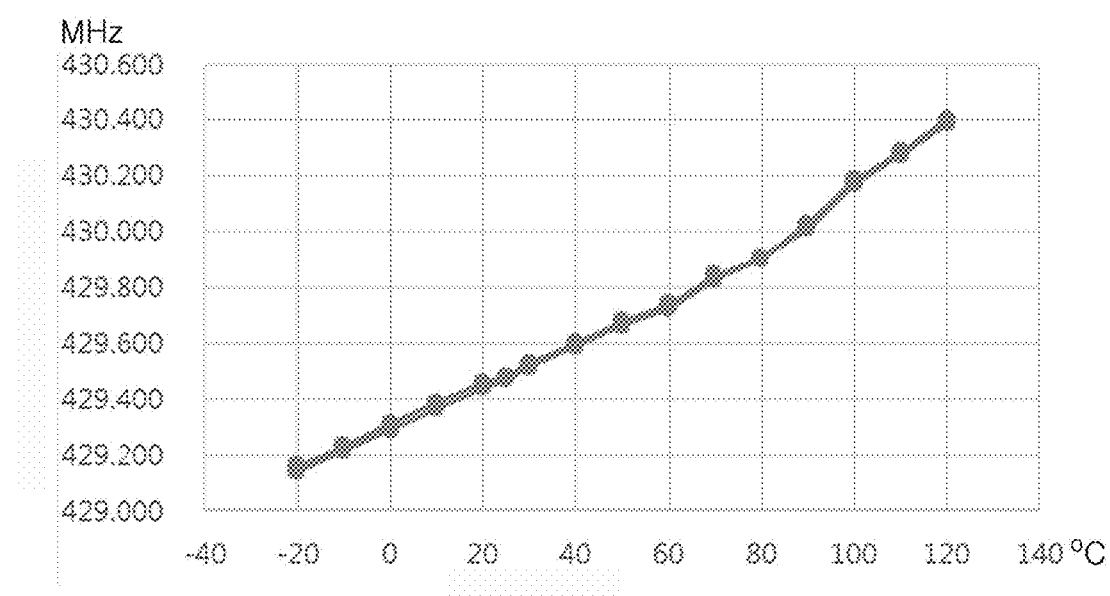
FIG. 7 is a graph illustrating a frequency change according to a temperature change by using the wireless temperature measurement apparatus using the SAW device according to the present invention.

Experimental results using the wireless temperature measurement apparatus of the present invention are shown in FIG. 7, and it can be seen that the frequency is changed according to the temperature change.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A wireless temperature measurement apparatus using a surface acoustic wave apparatus (SAW), the apparatus comprising:
    a surface acoustic wave (SAW) device including an inter-digital transducer (IDT) that generates a surface acoustic wave by an applied alternating current (AC) signal and a reflector which reflects the surface acoustic wave generated by the IDT and outputs the wave to an antenna, wherein a vibration characteristic of the surface acoustic wave of the SAW device is deformed by a physical characteristic deformation caused by a temperature change; and
    a reader configured to:
        generate a transmitting signal within a set frequency band and transmit the transmitting signal to the SAW device,
        detect a signal having an amplified resonance frequency which matches a frequency of a deformed surface acoustic wave which is one of reflected waves output from the SAW device, the deformed surface acoustic wave being physically deformed according to the vibration characteristic of the SAW device which is deformed by the temperature change, and
        detect a temperature of a place in which the SAW device is mounted by comparing the amplified resonance frequency of the detected signal with a preset frequency.

2. The apparatus of claim 1, wherein the reader includes:
    a receiving part receiving the reflected waves through the antenna, the reflected waves being output from the SAW device;
    a transmitting part generating the transmitting signal within the set frequency band to be transmitted to the SAW device, and transmitting the transmitting signal to the antenna, and
    an arithmetic processing part calculating the temperature of the place in which the SAW device is mounted by comparing the amplified resonance frequency of the detected signal, which is received by the receiving part, with the preset frequency.

3. The apparatus of claim 2, wherein the reader further includes:
    a switching part provided between the receiving part and the transmitting part and switching from a transmitting mode to a receiving mode, or vice-versa, such that signals that are transmitted from and received by the antenna are transmitted to the arithmetic processing part without interfering with each other.

4. The apparatus of claim 2, wherein the receiving part includes:
    at least one amplifier amplifying the reflected waves received from the antenna;
    at least one filter passing only the signal having the amplified resonance frequency that matches the frequency of the deformed surface acoustic wave, and
    a voltage conversion circuit outputting a DC voltage to the arithmetic processing part, wherein the DC voltage is proportional to an amplitude of the detected signal having the amplified resonance frequency which has been amplified and filtered.

5. The apparatus of claim 2, wherein the transmitting part includes:
    a transmitter-phase locked loop (Tx-PLL) generating the transmitting signal within the set frequency band;
    at least one filter outputting only a signal having a deformed frequency among signals generated by the Tx-PLL to the antenna, wherein the deformed frequency is the frequency of the deformed surface acoustic wave which was changed by the physical characteristic of the SAW device according to the temperature change, and
    an amplifier amplifying the signal generated by Tx-PLL and transmitting the amplified signal to the antenna.

6. The apparatus of claim 5, wherein the arithmetic processing part simultaneously shuts down power supplied to the Tx-PLL when the transmitting signal is output from the Tx-PLL, such that the transmitting signal output from the Tx-PLL is free from affecting the receiving part.

* * * * *